Patented Mar. 10, 1925.

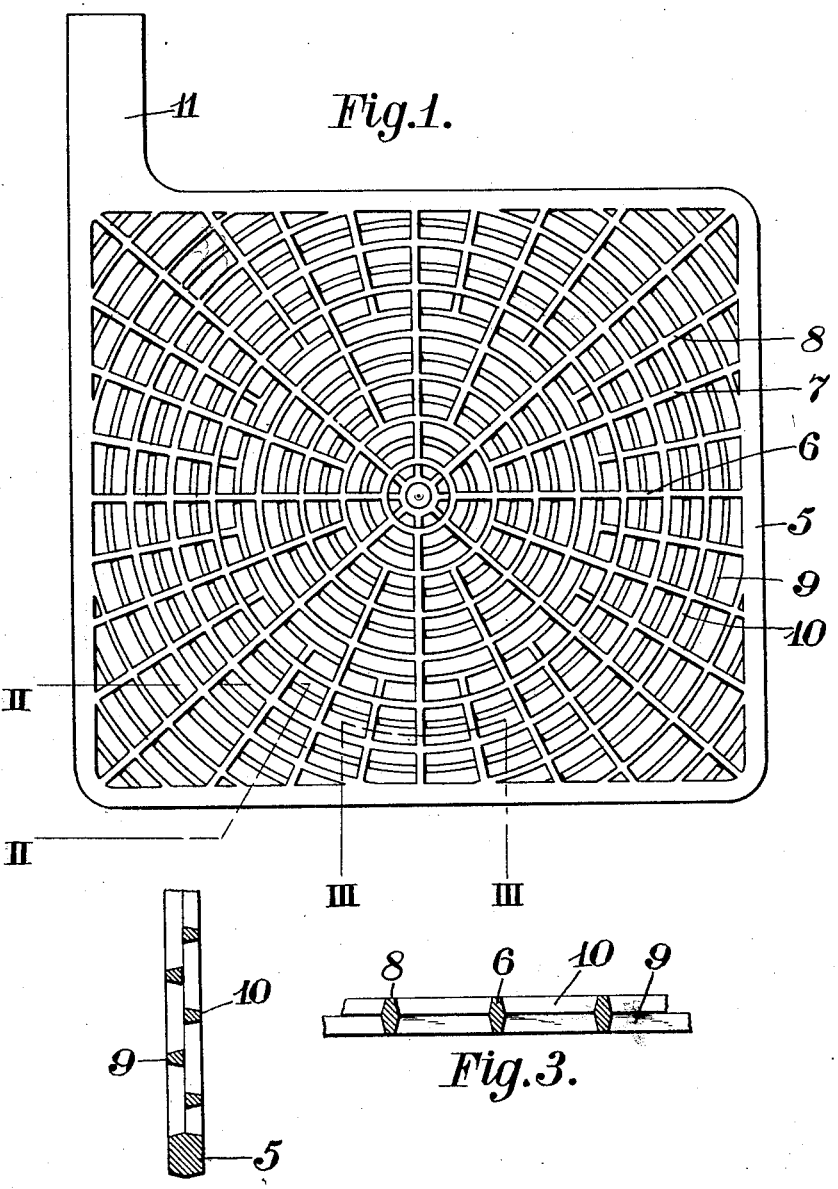

1,528,963

UNITED STATES PATENT OFFICE.

EDWARD S. ADAMS AND WALTER H. ADAMS, OF COLUMBUS, OHIO.

GRID FOR STORAGE-BATTERY PLATES.

Application filed August 19, 1920. Serial No. 404,595.

*To all whom it may concern:*

Be it known that we, EDWARD S. ADAMS and WALTER H. ADAMS, citizens of the United States, residing at Columbus, in the county of Franklin and State of Ohio, have invented a certain new and useful Improvement in Grids for Storage-Battery Plates, of which the following is a specification.

Heretofore much trouble and loss have been occasioned by the warping and breakage of the plates of storage batteries. When such a plate warps it bulges at one side near the center and pushes over against both the adjoining separators, thereby wearing holes in them, causing a short circuit and destroying the utility of the battery. This warping in the prior constructions is due, we believe, to the fact that the plate gets hottest at the center, hence it has been our aim to provide an improved construction in which the metal is relatively small in quantity at the center but of gradually increasing mass toward the rim whereby not so much heat is generated at the center and that heat rapidly conducted away, distributed, and dissipated, thereby avoiding the principal cause of the troubles and prolonging the life of the battery. The invention is embodied as herein shown and described, the features of novelty being finally claimed.

In the accompanying drawing—

Figure 1 is a view in side elevation of a plate according to the invention.

Fig. 2 is a partial section on the line II—II Fig. 1 on a larger scale.

Fig. 3 is a partial section on the line III—III Fig. 1, on a larger scale.

In the views the rim 5 of the plate is rectangular as usual to fit in the jar. Interiorly the grid, as shown, is formed of groups of bars or ribs 6, 7 and 8 radiating from the middle of the grid, some of said ribs being short and others longer to occupy the widening spaces between the longer ones and thereby secure an approach to uniformity of distance between them. These radial ribs are of the same thickness as the rim 5, their cross sections being of inward dovetail from both faces of the grid. Intersecting the radial ribs are concentric substantially equally spaced circular ribs 9 and 10, said ribs being of half the depth of the radial ribs and dovetailed inward. This dovetailing, however, is used because of convenience in casting the grid with a two part mold. These circular ribs on opposite sides alternate in their position so that the paste applied in one pocket on one side is keyed to the paste in two other pockets on the opposite side and an unbroken connection of the paste secured in all the pockets. 11 is the usual stem for connecting the plate with the pillar post of the cell.

In a general way the form of the grid resembles a spider's web except that the connectors for the radial ribs are formed on curves. Because the ribs are of arched form they are more susceptible of flexion individually in the plane of the plate to permit the plate to expand or contract in all directions radially under the influence of variations in temperature. In the construction shown there is an intermediate zone of ribs shorter than those extending from the middle region of the plate hence tendency of expansion or buckling of the middle region is resisted and not appreciably communicated to the rim. It will be understood, of course, such plates are best of lead and that the interstices of the grid are to be filled with a suitable paste of active material. We have discovered that a plate including substantially the form of grid herein shown overcomes much trouble heretofore experienced by reason of warping and breakage, and that such a plate is capable of withstanding hard usage.

The forms and proportions of the parts can be changed without departing from the gist of the invention as claimed.

What we claim is:

A grid for a storage battery plate consisting of a frame containing a paste receiving structure comprising bars substantially all of which coincide with lines radiating from the center of the plate some of said bars extending toward the rim from points remoter than others from the center of the plate, and  ribs concentric with said center of the plate intersecting said radiating bars.

EDWARD S. ADAMS.
WALTER H. ADAMS.